United States Patent [19]

Maiwald-Hiller et al.

[11] Patent Number: 5,208,099

[45] Date of Patent: May 4, 1993

[54] OXIDATION PROTECTION PROCESS FOR POROUS CARBON BODIES

[75] Inventors: Ines Maiwald-Hiller, Waiblingen; Karen B. Riedl; Jörg Arndt, both of Tübingen, all of Fed. Rep. of Germany

[73] Assignee: Daimler-Benz, Fed. Rep. of Germany

[21] Appl. No.: 940,208

[22] Filed: Sep. 8, 1992

[30] Foreign Application Priority Data

Sep. 6, 1991 [DE] Fed. Rep. of Germany ....... 4129600

[51] Int. Cl.[5] .................... B32B 9/00; B05D 3/02
[52] U.S. Cl. .................... 428/306.6; 427/379; 427/380; 427/419.7; 428/307.3; 428/307.7; 428/408
[58] Field of Search ............ 427/379, 380, 419.7; 428/306.6, 307.3, 307.7, 408, 688

[56] References Cited

U.S. PATENT DOCUMENTS

| | | | |
|---|---|---|---|
| 3,706,596 | 12/1972 | Wallauch | 428/408 |
| 4,461,806 | 7/1984 | Ikeda et al. | 428/408 |
| 4,500,602 | 2/1985 | Patten et al. | 428/408 |
| 4,585,675 | 4/1986 | Shuford | 427/376.2 |
| 4,857,395 | 8/1989 | Benton et al. | 428/306.6 |
| 4,863,773 | 9/1989 | Rousseau et al. | 428/408 |

FOREIGN PATENT DOCUMENTS

| | | |
|---|---|---|
| 2600169 | 7/1977 | Fed. Rep. of Germany . |
| 3005902 | 9/1981 | Fed. Rep. of Germany . |
| 3426911 | 1/1986 | Fed. Rep. of Germany . |
| 3622437 | 10/1987 | Fed. Rep. of Germany . |
| 3731540 | 3/1989 | Fed. Rep. of Germany . |
| 3942025 | 6/1991 | Fed. Rep. of Germany . |
| 4003627 | 6/1991 | Fed. Rep. of Germany . |

*Primary Examiner*—William J. Van Balen
*Attorney, Agent, or Firm*—Evenson, McKeown, Edwards & Lenahan

[57] ABSTRACT

A process for impregnating porous carbon bodies, in particular carbon fiber-reinforced carbon bodies, protects against oxidation by atmospheric oxygen. The open pores present in the carbon body are lined both in the interior and on the surfaces with a low viscosity gel and/or sol, formed from refractory and/or non-combustible inorganic compounds, as antioxidants. The antioxidant applied has a layer thickness of about 1 micrometer and is highly elastic. It adapts very well to the thermal expansions of the carbon body and is resistant to heat up to above 1000° C.

10 Claims, No Drawings

_5,208,099_

OXIDATION PROTECTION PROCESS FOR POROUS CARBON BODIES

BACKGROUND AND SUMMARY OF THE INVENTION

The present invention relates to a process for impregnating porous carbon bodies for protection against oxidation and, particularly, to a process for impregnating porous carbon bodies, namely, carbon fiber-reinforced carbon bodies, for protection against oxidation. The carbon bodies are treated at room temperature under vacuum with a low viscosity gel and/or sol, formed from refractory and/or non-combustible inorganic compounds, as antioxidant, in an excess, with respect to the open pore volume which is present in the carbon body and is to be lined. The open pores in the carbon bodies are penetrated by the antioxidant and the surfaces of these pores and the outer surfaces of the carbon bodies are wetted with a coherent coating of the antioxidant, after which the gel and/or sol is allowed to dry at room temperature, the vacuum being removed to atmospheric pressure.

Both because of their good technical characteristics, such as resistance to friction at high temperatures, and also because of their acceptability from environmental and health standpoints, bodies consisting of carbon, in particular carbon fiber-reinforced carbon bodies, have already found extensive use in industry.

A disadvantage of these materials is that they have low resistance to oxidation by atmospheric oxygen at relatively high temperatures, i.e. at temperatures of as low as 350° to 500° C. If these materials are used, for example, as friction material, they are continuously exposed to wear at their surfaces. Protection against oxidation by oxygen can therefore not be achieved merely by applying a protective layer on the surface of the carbon bodies, as is customary in the case of carbon components in the aerospace industry. In the case of a carbon body used as friction material, the entire body, that is to say including the interior of the material, must accordingly be treated homogeneously with the antioxidant.

There has been no lack of attempts to eliminate this disadvantage of oxygen sensitivity in the case of carbon bodies, which otherwise, because of their good technical use characteristics, can be used in diverse applications, including friction material.

Thus, German Offenlegungsschrift No. 3,005,902 describes protection of carbon-containing components of metallurgical aggregates against oxidation by forming a glassy mass in the pores, first by saturating the component with orthophosphoric acid, then drying it, subsequently resaturating the component with an organometallic compound and heating the re-saturated component to the temperature for phosphate formation.

German Offenlegungsschrift No. 3,731,540 describes a friction material in which the pore regions of a composite material, which comprises a carbon fiber-reinforced carbon material, have been infiltrated by a metal.

German Offenlegungsschrift No. 3,622,437 describes a friction element consisting of a carbon-carbon composite material, which, in order to improve the oxidation characteristics, also contains one or more nitrides of the elements of group IVb of the Periodic System of the Elements.

German Offenlegungsschrift No. 2,600,169 describes a process for the production of carbon coatings on carbon materials or metals in which refractory or non-combustible substances are introduced into the fine carbon layer to be applied. These substances are specifically, acrylamide polymers which are pyrolyzed.

German Offenlegungschrift No. 3,426,911 describes a carbon-carbon composite article which consists of a carbon-carbon substrate, a SiC coating and a layer of $Si_3N_4$, applied by chemical vapor deposition (CVD), on the outer surface of the SiC layer in order, inter alia, to eliminate the sensitivity of the carbon materials towards oxidation.

German patent No. 3,942,025 discloses a protective layer for the prevention of oxygen embrittlement of titanium components, which layer consists of Na waterglass varnish and silicon powder.

German patent No. 4,003,627 describes the use of a sol/gel process for glazing moldings consisting of at least latent hydraulic binder systems. In this process, the surface of a hardened molding is coated with a $SiO_2$ containing glaze slip in dissolved or colloidal form. It is also possible for the slip to contain boron or sodium tetraborate.

U.S. Pat. No. 3,706,596 discloses a process to increase the oxidation stability by treating carbon materials successively with a colloidal dispersion of finely divided silica and an impregnating solution of methyl borate and methyl phosphate, so that a $SiO_2-B_2O_3-P_2O_5$ glaze forms on the accessible surfaces.

U.S. Pat. No. 4,863,773 discloses a composite material containing carbon fibers, in which material the individual carbon fibers are coated with a layer of SiC and these are embedded in a material consisting of C/SiC. SiC layers, which are surrounded by silica and a $SiO_2-B_2O_3$ glass layer, are present as a surface seal.

These known processes for protecting carbon bodies against oxidation by atmospheric oxygen are in some cases very expensive and do not always meet the expectations.

An object on which the present invention is based is to obtain, by way of a technically simple process, good protection against oxidation by the ambient atmosphere in the case of carbon bodies having very diverse specification profiles. The aim is that the carbon body should have good friction characteristics when used as friction material and an optimum ratio between coefficient of friction and wear should be maintained.

The foregoing object has been achieved according to the present invention by a process in which the carbon body is treated with $SiO_2-B_2O_3$ gel and/or sol having a molar composition of $SiO_2$ to $B_2O_3$ of 60:40 to 85:15 as the antioxidant, the treatment of the carbon body with the anti-oxidant is carried out at a temperature of 15° to 25° C. under a vacuum of $10^{-2}$ to $10^{-4}$ bar, and subsequently, the carbon body treated in this way, with the antioxidant which has infiltrated the pores and has been applied to the surfaces, is subjected to a multistage temperature treatment. The carbon body, after the drying operation in air, is first further dried for up to 5 hours at 110° to 130° C., then is kept at a temperature of 200° C. for up to 2 hours and then kept at a temperature of up to 600° C. for a period of 2 to 10 hours.

DETAILED DESCRIPTION OF THE INVENTION

The process according to the present invention is illustrated in more detail through the following examples:

Example 1

45 ml of ethyl alcohol, 12.5 ml of tri-distilled water and 30 drops of 1 molar hydrochloric acid were added to 72 ml of tetraethyloxisilane (TEOS, $Si(OC_2H_5)_4$), and the mixture was mixed by stirring for 45 minutes. 17 ml of boron tributylborate ($B(OC_4H_9)_3$) were then added and the entirety was stirred for a further 20 minutes. An identical amount (12.5 ml) of tri-distilled water was again added to this batch and the total batch was stirred for 24 hours. The preparation of the gel was carried out at 25° C. in a closed vessel, in order to prevent evaporation of the highly volatile components.

Prior to treatment of the carbon body, the gel formed was left to stand for a further 6 hours, without stirring, during which period a low viscosity gel (0.9 mPa.s at 20° C.) had formed, in which the molar ratio of $SiO_2$:$B_2O_3$ was 80:20.

Example 2

The batch was prepared from 62 ml of TEOS, 25.5 ml of $B(OC_4H_9)_3$, 28 ml of $H_2O$, 31 ml of $C_2H_5OH$ and 30 drops of 1 molar HCl and a gel, which had a molar ratio of $SiO_2$:$B_2O_3$ of 70:30 and a viscosity of 0.9 mPa.s at 20° C., was obtained by the same procedure as in Example 1.

Prior to treatment, the carbon body was cleaned by ultrasound and introduced into the treatment vessel, in which a vacuum of $10^{-3}$ bar was maintained for at least 30 minutes. The period for which vacuum is applied depends on the porosity of the carbon body and on the size of its pores. The low viscosity gel was then introduced into the vessel, which was under vacuum, and acted on the carbon body for 5 minutes. Because of the vacuum which also existed in the pores of the carbon body, the gel penetrated into the open pores of the carbon body. At the same time, as a consequence of the good wetting capacity of the gel, a thin gel layer, which likewise had a thickness of less than 1 $\mu$m, formed on the outer surfaces of the carbon body. Following the 5-minute action period, the vacuum in the vessel was relieved and the excess gel was removed from the withdrawn carbon body by dabbing in order to prevent clogging of the surface pores.

To achieve particularly good protection against oxidation, the treatment indicated above can be repeated once or several times more. After each treatment, the carbon body is then air dried for a period of 30 to 60 minutes at room temperature. Following the final action period of the gel on the carbon body, the latter was dried over a period of 5 hours at a temperature of 120° C. to remove excess water and alcohol from the gel. For this procedure, heating was carried out gently using a temperature rise of, at most, 2° C./minute. A more rapid temperature rise leads to sudden degassing of the pores of the carbon body and thus to destruction of the protective layer on the surface.

Heating was then continued using a temperature rise of 4° C./minute to 200° C. The temperature must pass through this range more rapidly because the gel otherwise tends to bind organic constituents more firmly which, during the subsequent further temperature rise, leads to carbonization of the gel, which is visible as a black coloration.

Heating was then carried out using a temperature rise of at most 3° C./minute to 600° C., in order to remove any residual organic constituents. An amorphous $SiO_3$¹ $B_2O_3$ lattice is obtained which is free from organic bonds, as it was possible to demonstrate by infrared examination of the gels using a spectralphotometer.

The porosity of the treated carbon bodies was between 25% and 45%, advantageously 35%. In particular, it has been found that the proportion of open pores should be as high as possible, since the higher the proportion of open pores, the larger is the pore surface protected by the gel layer. The pore size itself is not a critical parameter, since, in the treatment of the carbon body according to the present invention, the low viscosity gel penetrates into all open pores and lines or coats these uniformly. Those closed pores into which the gel is not able to penetrate, atmospheric oxygen is also unable to penetrate so that the desired antioxidant function is not impaired. If, when the treated carbon body is used as friction material, closed pores originally present beneath its surface become open pores as a result of a friction operation, at least some of the open pores formed in this way will be lined with the gel particles removed from the surface by friction during the friction operation.

The advantages which are achieved by the process in accordance with the present invention are, on one hand, that the carbon body is provided with a very thin boron silicate layer, the thickness of which is less than 1 micrometer both in its interior and on its surfaces. This layer is highly elastic and adapts very well to the thermal expansion and the modulus of elasticity of the carbon body. The boron silicate layer also provides the carbon body with a protective layer which is very resistant to heat. With a melting point of about 450° C., a protective layer consisting only of $B_2O_3$ would give only a low level of protection against oxidation. Only the combination with the thermally more resistant $SiO_2$ gives a protective layer which is heat resistant to temperatures clearly above 1000° C.

The protective layer obtained according to the process of the present invention also has very good adhesion to the carbon body and the interpolated carbon fibers. Even under severe mechanical stress, no detachment phenomena of the protective layer from the carbon body were observed. This good adhesion of the protective layer is to be ascribed both to the purely physical adhesion of the protective layer to the carbon body and to chemical bonding between the carbon body and the boron silicate layer. The latter bonding can be envisaged such that, because of the stearic arrangement and of the hybridization state of the boron atom, chemical bonding exists between the boron proportion of the boron silicate layer and the free valencies of the coated carbon. The free bonds of the C surfaces are believed to be saturated by boroxol groups. The reactive carbon centers are then blocked by the boron oxide fraction and are no longer available to oxygen, as a result of which oxidation is successfully inhibited.

The process according to the invention itself can be carried out rapidly and without any problems in a technically very simple manner using inexpensive starting materials.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Process for impregnating a carbon fiber-reinforced carbon body to protect against oxidation, comprising the steps of treating the carbon body at room temperature under vacuum with at least one of a low viscosity $SiO_2-B_2O_3$ gel and sol having a molar composition of $SiO_2$ to $B_2O_3$ of 60:40 to 85:15 as an antioxidant, in an excess amount with respect to an open pore volume to be lined in the carbon body out at a temperature of 15° to 25° C. under a vacuum of $10^{-2}$ to $10^{-4}$ bar, penetrating the open pores in the carbon body with the antioxidant, wetting the surfaces of the open pores and outer surfaces of the carbon body with a coherent coating of the antioxidant, allowing the at least one of gel and sol to air dry at room temperature, changing the vacuum to atmospheric pressure, and subjecting the treated carbon body to a multistage temperature treatment with the carbon body, after the air drying step, first being further dried for up to 5 hours at 110° to 130° C., then being kept at a temperature of 200° C. for up to 2 hours and then being kept at a temperature of up to 600° C. for a period of 2 to 10 hours.

2. The process according to claim 1, wherein the carbon body to be impregnated has a porosity of 25% to 45%.

3. The process according to claim 1, wherein, with repeated treatment with the antioxidant, the carbon body is dried in air at room temperature for a period of 30 to 60 minutes after each treatment.

4. The process according to claim 1, wherein, after the final treatment with the antioxidant, the carbon body is first brought to a temperature of 110° to 130° C. at a heating rate of at most 2° C./minute, then is brought to a temperature of up to 200° C. at a heating rate of at most 4° C./minute, and finally is heated to a temperature of up to 600° C. at a heating rate of, at most, 3° C./minute.

5. The process according to claim 1, wherein, following the final treatment of the carbon body, the multistage temperature treatment is carried out in one of a nitrogen or rare gas atmosphere and under vacuum, at least in of the 600° heating stage.

6. The process according to claim 1, wherein the antioxidant consists of tetraethylene orthosilicate and boron alkoxide.

7. The process according to claim 1, wherein, prior to the first treatment with the antioxidant, the carbon body has installation-ready dimensions.

8. A use of a carbon body protected against oxidation as a component subjected to wear, produced by a process wherein the carbon bodies are treated with $SiO_2-B_2O_3$ gel and/or sol having a molar composition of $SiO_2$ to $B_2O_3$ of 60:40 to 85:15 as antioxidant, the treatment of the carbon bodies with the antioxidant is carried out at a temperature of 15° to 25° C. under a vacuum of $10^{-2}$ to $10^{-4}$ bar, and subsequently, the treated carbon body, with the antioxidant which has infiltrated the pores and has been applied to the surfaces, is air dried and subjected to a multistage temperature treatment, first being dried for up to 5 hours at 110° to 130° C., then being kept at a temperature of 200° C. for up to 2 hours and then being kept at a temperature of up to 600° C. for a period of 2 to 10 hours.

9. A use of a carbon body, protected against oxidation, an abrasion-resistant friction material produced by a process wherein the carbon bodies are treated with $SiO_2-B_2O_3$ gel and/or sol having a molar composition of $SiO_2$ to $B_2O_3$ of 60:40 to 85:15 as antioxidant, the treatment of the carbon bodies with the antioxidant is carried out at a temperature of 15° to 25° C. under a vacuum of $10^{-2}$ to $10^{-4}$ bar, and subsequently, the treated carbon body with the antioxidant which has infiltrated the pores and has been applied to the surfaces, is air dried and subjected to a multistage temperature treatment, first being dried for up to 5 hours at 110° to 130° C., then being kept at a temperature of 200° C. for up to 2 hours and then being kept at a temperature of up to 600° C. for a period of 2 to 10 hours.

10. The use of a carbon body as set forth in claim 9, wherein the carbon body is incorporated as a friction material for brake and clutch linings.

* * * * *